US012563654B1

(12) United States Patent
Lang, Jr. et al.

(10) Patent No.: US 12,563,654 B1
(45) Date of Patent: Feb. 24, 2026

(54) LIGHTING CONTROL SYSTEM AND METHODS OF USE

(71) Applicant: American Technology Components, Inc., Elkhart, IN (US)

(72) Inventors: William Ridgway Lang, Jr., Granger, IN (US); Terran Michael Havlish, Elkhart, IN (US)

(73) Assignee: American Technology Components, Inc., Elkhart, IN (US)

( * ) Notice: Subject to any disclaimer, the term of this patent is extended or adjusted under 35 U.S.C. 154(b) by 155 days.

(21) Appl. No.: 18/234,498

(22) Filed: Aug. 16, 2023

(51) Int. Cl.
*H05B 47/10* (2020.01)
*H05B 47/11* (2020.01)

(52) U.S. Cl.
CPC .................................... *H05B 47/11* (2020.01)

(58) Field of Classification Search
CPC ........ H05B 47/10; H05B 47/11; H05B 47/14; H05B 47/155; H05B 45/10; H05B 45/30; H05B 45/315
See application file for complete search history.

(56) References Cited

U.S. PATENT DOCUMENTS

| | | | |
|---|---|---|---|
| 8,944,617 | B2 | 2/2015 | Crookham et al. |
| 9,581,303 | B2 | 2/2017 | Gordin et al. |
| 9,593,832 | B2 | 3/2017 | Beausoleil et al. |
| 9,976,714 | B2 | 5/2018 | Geisler et al. |
| 10,117,313 | B2 | 10/2018 | Chen |
| 10,785,836 | B2 | 9/2020 | Rollinson et al. |
| 10,989,379 | B2 | 4/2021 | Bien |
| 11,384,911 | B1 | 7/2022 | Bien |
| 11,614,207 | B2 | 3/2023 | Shum |
| 2006/0044789 | A1 | 3/2006 | Curtis |

(Continued)

FOREIGN PATENT DOCUMENTS

| | | | |
|---|---|---|---|
| CN | 111963970 | A | 11/2020 |
| CN | 112344258 | A | 2/2021 |

(Continued)

*Primary Examiner* — Jimmy T Vu

(74) *Attorney, Agent, or Firm* — Barnes & Thornburg LLP

(57) ABSTRACT

A lighting control system includes a driver, a sensor, and a microcontroller connected to the sensor and the driver. The driver selectively illuminates and/or turns off one or more lamps under specified conditions. The sensor detects light levels. The microcontroller is programmable to read the light levels detected by the sensor, determine if one or more of the specified conditions are satisfied, and operate the driver to selectively illuminate one or more of the lamps and/or turn one or more of the lamps off if one or more of the specified conditions is present. The system executes a method that includes the steps of establishing threshold ambient and UV light values, utilizing the sensor to detect an ambient light level and a UV light level, utilizing the microprocessor to compare the detected ambient light level with the threshold ambient light value, utilizing the microprocessor to compare the detected UV light level with the threshold UV light value, and utilizing the microprocessor to operate the driver to illuminate and/or turn off the lamp based on the comparison of the detected ambient light level with the threshold ambient light value and/or the comparison of the detected UV light level with the UV light threshold value.

17 Claims, 12 Drawing Sheets

(56) References Cited

U.S. PATENT DOCUMENTS

| | | | | |
|---|---|---|---|---|
| 2007/0177384 | A1 | 8/2007 | Sibalich et al. | |
| 2010/0178047 | A1 * | 7/2010 | Nitanda | H04N 23/00 396/213 |
| 2015/0216016 | A1 * | 7/2015 | Reed | H05B 47/16 315/159 |
| 2022/0225478 | A1 | 7/2022 | Suo et al. | |
| 2023/0003368 | A1 | 1/2023 | Verfuerth et al. | |
| 2023/0077519 | A1 * | 3/2023 | Cheung | A61B 5/1118 600/27 |

FOREIGN PATENT DOCUMENTS

| | | | |
|---|---|---|---|
| DE | 9215653 | U1 | 2/1993 |
| DE | 20220900 | U1 | 5/2004 |
| DE | 10333593 | A1 | 3/2005 |
| KR | 1020080081514 | A | 9/2008 |
| KR | 102222908 | B1 | 3/2021 |
| WO | 9732159 | A1 | 9/1997 |

* cited by examiner

LIGHTING CONTROL SYSTEM AND METHODS OF USE

The present invention relates to a lighting control system and methods of using a lighting control system.

BACKGROUND AND SUMMARY OF THE INVENTION

Various systems are known for automatically turning lights on and off at predetermined times or under certain conditions. Such systems can obviate the need for a user to directly turn the lights on and off at the desired time, or to monitor the applicable conditions and turn the lights on and off in response to those conditions. Examples of such systems are described in German Patent DE 103 33 593 A1, German Patent DE 202 20 900 U1, and U.S. Pat. No. 10,117,313.

In one embodiment of the present invention, a lighting control system includes a driver for selectively illuminating one or more lamps and turning off one or more lamps under specified conditions, a sensor for detecting light levels, and a microcontroller connected to the driver and the sensor. The microcontroller is programmable to read the light levels detected by the sensor, determine if one or more of the specified conditions are satisfied, and operate the driver to selectively illuminate one or more of the lamps and/or turn one or more of the lamps off if one or more of the specified conditions is present.

In one embodiment, the sensor includes a first photodiode for detecting ambient light levels and a second photodiode for detecting UV light levels. In another embodiment, the microcontroller is programmable with an ambient light threshold value and a UV light threshold value, and the microcontroller compares the detected ambient light levels with the ambient light threshold value and the detected UV light levels with the UV light threshold value to determine if one or more of the specified conditions is present.

In one embodiment of the present invention, a method of operating a lighting control system having a driver for selectively illuminating a lamp and turning the lamp off, a sensor for detecting light levels, and a microcontroller includes the steps of establishing a threshold ambient light value, establishing a threshold UV light value, utilizing the sensor to detect an ambient light level, utilizing the sensor to detect a UV light level, utilizing the microprocessor to compare the detected ambient light level with the threshold ambient light value, utilizing the microprocessor to compare the detected UV light level with the threshold UV light value, and utilizing the microprocessor to operate the driver to illuminate the lamp if the detected ambient light level is below the ambient light threshold value or the detected UV light level is below the UV light threshold value, and utilizing the microprocessor to operate the driver to turn the lamp off if the detected ambient light level is above the threshold ambient light value and the detected UV light level is above the UV light threshold value.

In one embodiment, the method further includes the steps of utilizing the sensor to detect multiple ambient light levels, utilizing the sensor to detect multiple UV light levels, utilizing the microprocessor to compare the multiple detected ambient light levels with the ambient light threshold value, utilizing the microprocessor to compare the multiple detected UV light levels with the UV light threshold value, and utilizing the microprocessor to operate the driver to illuminate the lamp if the multiple detected ambient light levels are below the ambient light threshold value or the multiple detected UV light levels are below the UV light threshold value, and utilizing the microprocessor to operate the driver to turn the lamp off if the multiple detected ambient light levels are above the threshold ambient light value and the multiple detected UV light levels are above the UV light threshold value.

In another embodiment, the method further includes the steps of specifying a number of consecutive detected ambient light levels below the ambient light threshold value required to cause the microprocessor to operate the driver to illuminate the lamp, specifying a number of consecutive detected UV light levels below the UV light threshold value required to cause the microprocessor to operate the driver to illuminate the lamp, specifying a number of consecutive detected ambient light levels above the ambient light threshold value required to cause the microprocessor to operate the driver to turn the lamp off, specifying a number of consecutive detected UV light levels above the UV light threshold value required to cause the microprocessor to operate the driver to turn the lamp off, and wherein the number of consecutive detected ambient light levels above the ambient light threshold value and the number of consecutive detected UV light levels above the UV light threshold value required to cause the microprocessor to operate the driver to turn the lamp off are greater than the number of consecutive detected ambient light levels below the ambient light threshold value and the number of consecutive detected UV light levels below the UV light threshold value required to cause the microprocessor to operate the driver to illuminate the lamp.

In some embodiments, the microcontroller compares an average of the multiple detected ambient light levels with the ambient light threshold value and an average of the multiple detected UV light levels with the UV light threshold value.

In other embodiments, the method further includes the step of utilizing the microprocessor to determine the rate of change of the detected ambient light levels and the rate of change of the detected UV light levels, and utilizing the microprocessor to operate the driver to increase and decrease the illumination intensity of the lamp based on at least one of the rates of change.

In certain embodiments, the method further includes the step of establishing a hysteresis level associated with the ambient light threshold value and the UV light threshold value, and the microprocessor excludes detected ambient light levels and detected UV light levels within the hysteresis level from the comparisons utilized by the microprocessor to operate the driver.

In one embodiment of the present invention, a method of operating a lighting control system having a driver for selectively illuminating a lamp and turning off the lamp, a sensor for detecting light levels, and a microcontroller includes the steps of establishing a threshold ambient light value, establishing a threshold UV light value, utilizing the sensor to detect an ambient light level, utilizing the sensor to detect a UV light level, utilizing the microprocessor to compare the detected ambient light level with the threshold ambient light value, utilizing the microprocessor to compare the detected UV light level with the threshold UV light value, and utilizing the microprocessor to operate the driver to illuminate and/or turn off the lamp based on the comparison of the detected ambient light level with the threshold ambient light value and/or the comparison of the detected UV light level with the UV light threshold value.

In one embodiment, the microprocessor operates the driver to illuminate the lamp if the detected ambient light level is below the ambient light threshold value.

In another embodiment, the microprocessor operates the driver to illuminate the lamp if the detected UV light level is below the UV light threshold value.

In certain embodiments, the microprocessor operates the driver to turn the lamp off if the detected ambient light level is above the threshold ambient light value and the detected UV light level is above the UV light threshold value.

In another embodiment, the method further includes the steps of utilizing the sensor to detect multiple ambient light levels, utilizing the sensor to detect multiple UV light levels, utilizing the microprocessor to compare the multiple detected ambient light levels with the ambient light threshold value, utilizing the microprocessor to compare the multiple detected UV light levels with the UV light threshold value, and utilizing the microprocessor to operate the driver to illuminate and/or turn off the lamp based on the comparison of the multiple detected ambient light levels with the threshold ambient light value and/or the comparison of the multiple detected UV light levels with the UV light threshold value.

In one embodiment, the method further includes the steps of specifying a number of consecutive detected ambient light levels required to cause the microprocessor to operate the driver to illuminate the lamp, specifying a number of consecutive detected UV light levels required to cause the microprocessor to operate the driver to illuminate the lamp, specifying a number of consecutive detected ambient light levels required to cause the microprocessor to operate the driver to turn the lamp off, and specifying a number of consecutive detected UV light levels required to cause the microprocessor to operate the driver to turn the lamp off. The number of consecutive detected ambient light levels and consecutive detected UV light levels required to cause the microprocessor to operate the driver to turn the lamp off are greater than the number of consecutive detected ambient light levels and consecutive detected UV light levels required to cause the microprocessor to operate the driver to illuminate the lamp.

In one embodiment, the microcontroller compares an average of the multiple detected ambient light levels with the ambient light threshold value and an average of the multiple detected UV light levels with the UV light threshold level.

In another embodiment, the method further includes the steps of utilizing the microprocessor to determine the rate of change of the detected ambient light levels and the rate of change of the detected UV light levels and utilizing the microprocessor to operate the driver to increase and decrease the illumination intensity of the lamp based on at least one of the rates of change.

In certain embodiments, the method further includes the steps of establishing a hysteresis level associated with the ambient light threshold value and the UV light threshold value, and the microprocessor excludes detected ambient light levels and detected UV light levels within the hysteresis level from the comparisons utilized by the microprocessor to operate the driver.

In one embodiment of the present invention, a method of operating a lighting control system having a driver for selectively illuminating a lamp and turning off the lamp, a sensor for detecting light levels, and a microcontroller includes the steps of establishing a threshold value for a first type of light, establishing a threshold value for a second type of light, utilizing the sensor to detect a level of the first type of light, utilizing the sensor to detect a level of the second type of light, utilizing the microprocessor to compare the detected level of the first type of light with the threshold value of the first type of light, utilizing the microprocessor to compare the detected level of the second type of light with the threshold value for the second type of light, and utilizing the microprocessor to operate the driver to illuminate and/or turn off the lamp based on the comparison of the detected level of the first type of light with the threshold value for the first type of light and the comparison of the detected level of the second type of light with the threshold value for the second type of light.

These and other features of the present invention will be apparent from the following description of embodiments of the invention and the accompanying drawings.

DETAILED DESCRIPTION OF EMBODIMENTS OF THE INVENTION

Figure 1:
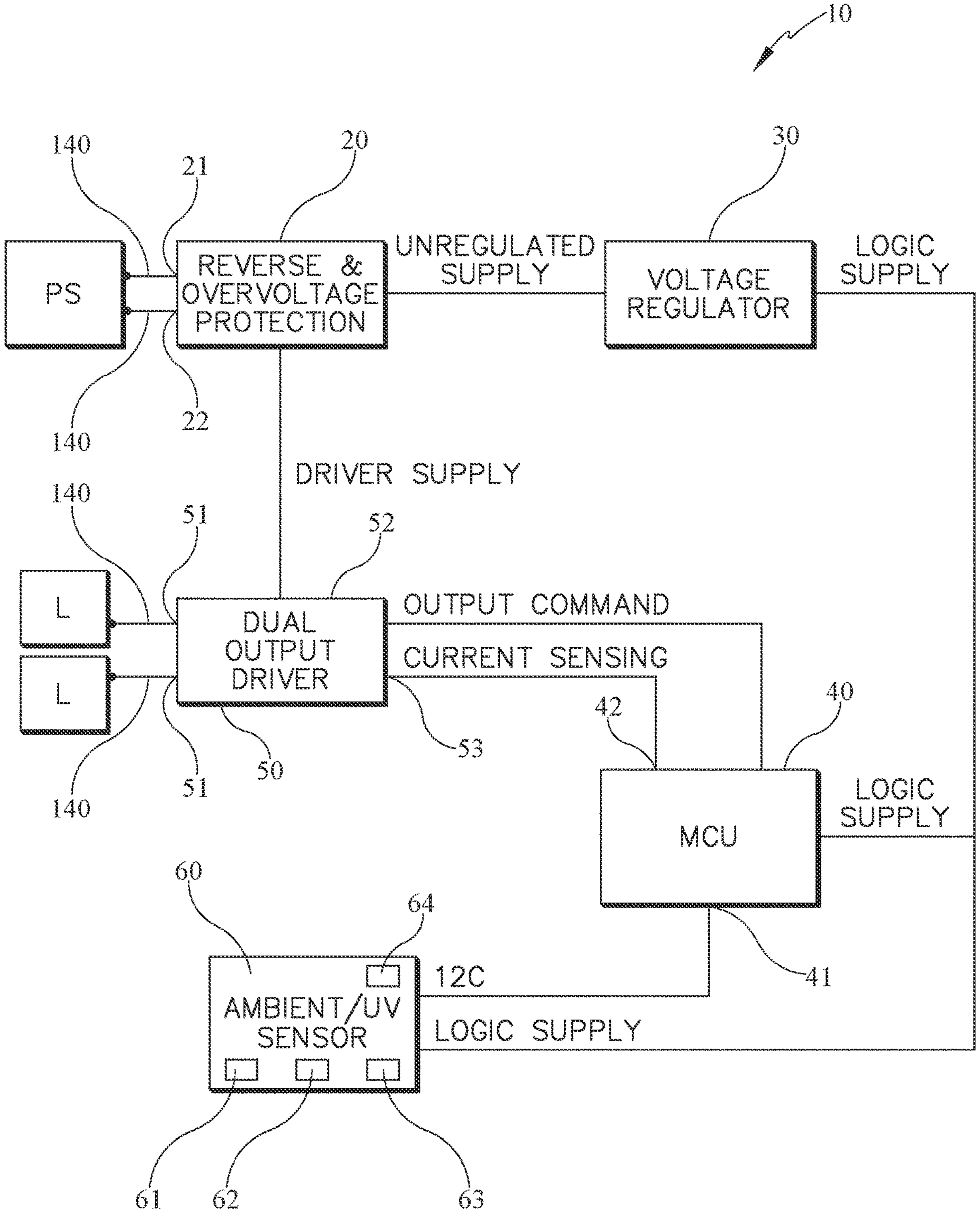
FIG. 1 is a diagrammatic view of a lighting control system according to one embodiment of the present invention.

FIG. 1 is a diagrammatic view of a lighting control system 10 according to one embodiment of the present invention. In the embodiment shown, system 10 generally includes a protection circuit 20, a voltage regulator 30, a microcontroller 40, an output driver 50, and a sensor 60.

Protection circuit 20 is connected to a source of power PS (such as a car battery or 12 volt marine battery) via power inputs 21 and 22. In certain embodiments of the invention, system 10 operates at voltages between 6 volts and 26 volts. In one embodiment of the invention, the supply current is less than 2 mA when the output from output driver 50 is off and 6 mA plus the current of lamps L when the output is on to illuminate lamps L, as described below. Protection circuit 20 provides both reverse voltage protection and overvoltage protection for power source PS and other components of system 10 as is known in the art.

Voltage regulator 30 is connected between protection circuit 20 and the logic supply for microcontroller 40. Voltage regulator 30 reduces the supply voltage from power source PS to a level suitable for microcontroller 40 and sensor 60. In certain embodiments of the invention, microcontroller 40 and sensor 60 can operate at +3.3 volts.

Microcontroller 40 is, in the embodiment shown, a programmable microcontroller. Microcontroller 40 turns output driver 50 on and off to selectively illuminate lamps L turn lamps L off as described below. Microcontroller 40 receives data from sensor 60 via input 41. Output driver 50 provides voltage proportional to the output current of driver 50 to microcontroller 40 via input 42. Microcontroller 40 will turn off output driver 50 if an overcurrent condition is sensed.

Output driver 50 includes one or more outputs 51 connected to lamps L. Output driver 50 receives an on/off or output command from microcontroller 40 via input 52 to turn output driver 50 on and off. When output driver 50 is on, lamps L are illuminated. Conversely, when output driver 50 is off, lamps L are not illuminated. Output driver 50 further includes an output 53 to supply voltage proportional to the output current of driver 50 to microcontroller 40 as described above. In certain embodiments, output driver 50 includes overvoltage, overcurrent, and over-temperature protection. Output driver 50, in some embodiments of the invention also limits current (for example, to 7.6 A) if a short circuit occurs. In some embodiments, output driver 50 limits output current to 4 A if in an over-temperature condition occurs.

Sensor 60 is a dual ambient light/UV light sensor. As used in this disclosure, "ambient light" means light having a wavelength of 450 nm to 650 nm, and "UV light" means light having a wavelength of 280 nm to 380 nm. In one embodiment of the invention, sensor 60 includes a first photodiode 61 for detecting ambient light levels, a second photodiode 62 for detecting UV light levels, an analog to digital converter 63 for reading photodiodes 61 and 62, and an output logic circuit 64 for outputting data to microcontroller 40.

Figure 2:
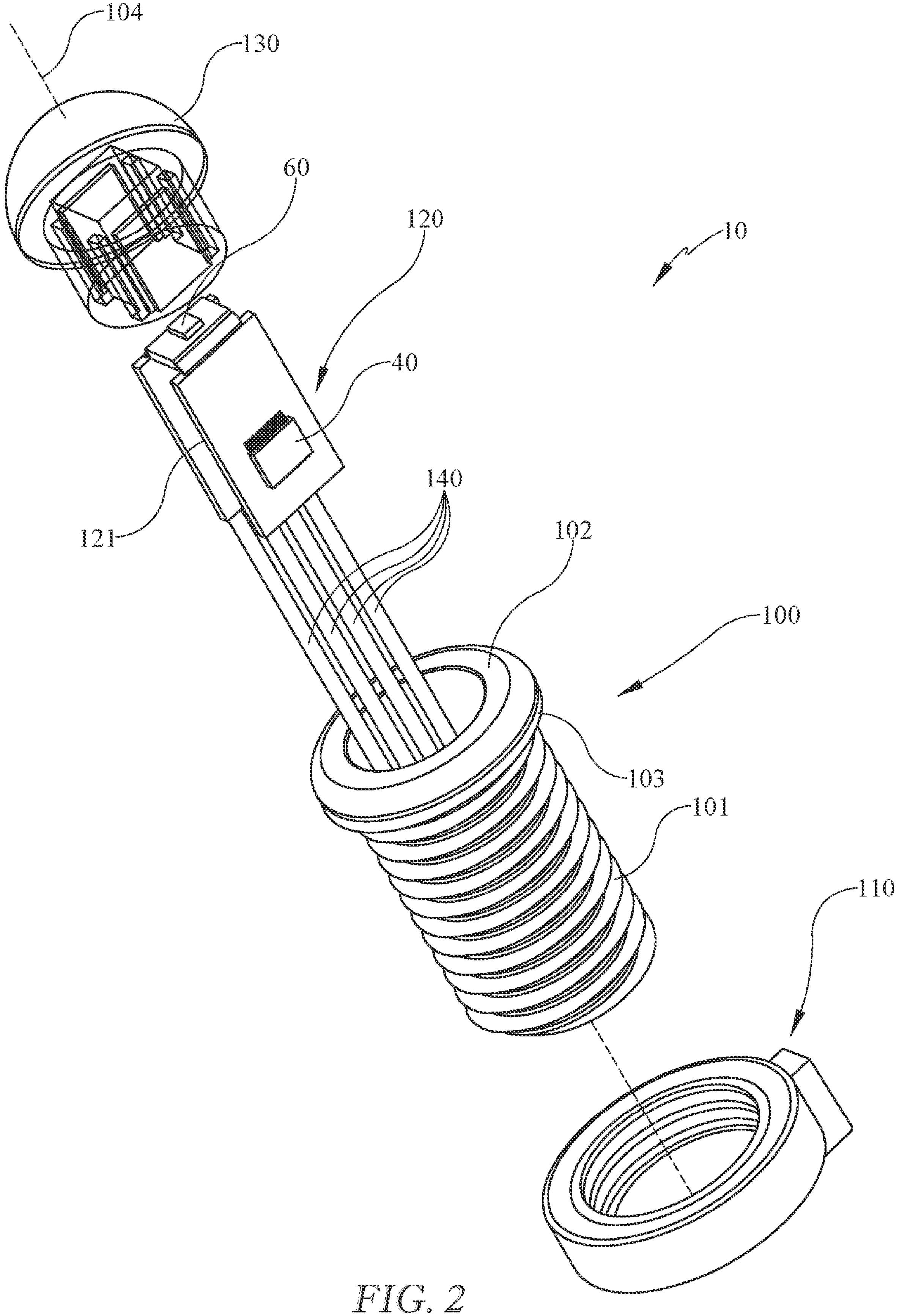
FIG. 2 is an exploded perspective view of an embodiment of a lighting control system according to one embodiment of the present invention.
Figure 3:
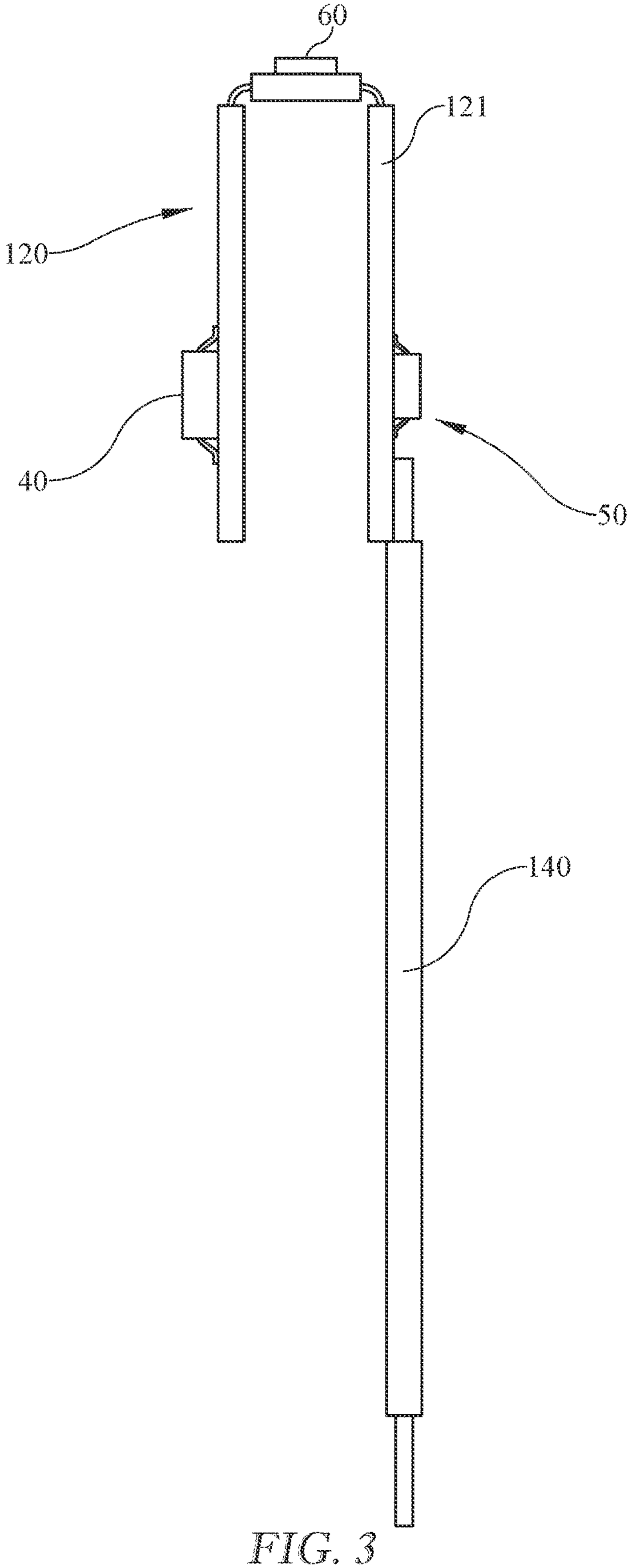
FIG. 3 is a side elevational view of an operational circuit and leads that are components of the lighting control system shown in FIG. 2.
Figure 4:
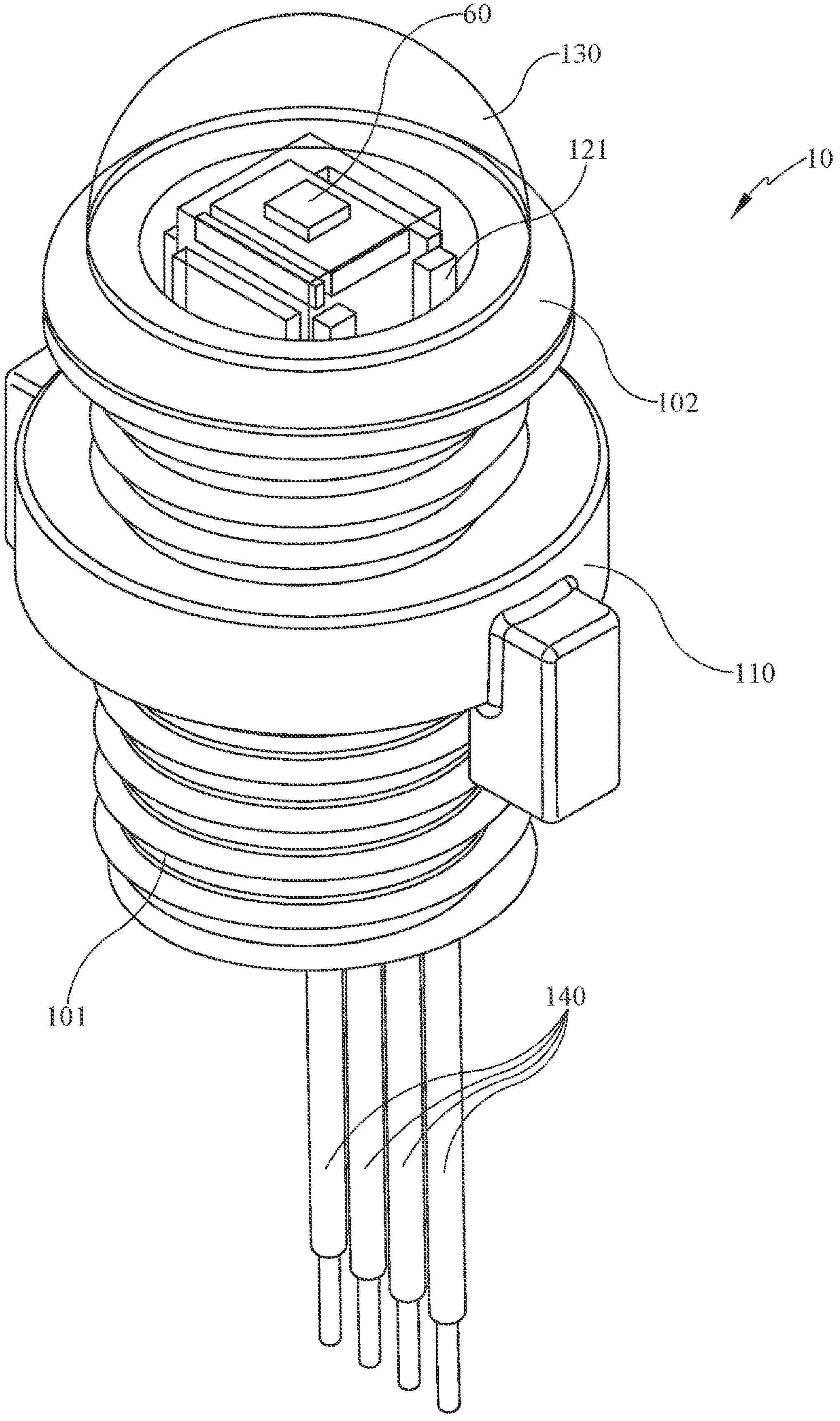
FIG. 4 is a perspective view of the lighting control system shown in FIG. 2.

One embodiment of system 10 is shown in FIGS. 2-4. In this embodiment, system 10 generally includes a body 100, an attachment mechanism 110, an operational circuit 120, a cover 130, and leads or wires 140. In the embodiment shown, body 100 is a substantially tubular member having an externally threaded section 101, a flange 102, a washer or gasket 103, and a longitudinal axis 104. Attachment mechanism 110 in the embodiment shown is an internally threaded nut. Body 100 can be secured in an opening formed in, for example, a component of a boat, and secured in place by threading attachment mechanism 110 onto threaded section 101 of body 100. Body 100 and attachment mechanism 110 can be manufactured from any material sufficiently durable for the intended operating environment, such as, for example, a sufficiently durable plastic material. Operational circuit 120, in the embodiment shown, includes a printed circuit board 121 on which protection circuit 20, voltage regulator 30, microcontroller 40, output driver 50, and sensor 100 are mounted. In certain embodiments, printed circuit board 121 is a flexible circuit board. For example, in the embodiment shown in FIGS. 2-4, printed circuit board 121 is a flexible printed circuit board formed into a generally U-shaped configuration. In this embodiment, sensor 60 is oriented so as to face cover 130 in the direction along longitudinal axis 104 of body 100. Operational circuit 120 is located at least partially within body 100. In certain embodiments, operational circuit 120 is protected from moisture, such as by encapsulation, potting or scaling. Cover 130 is positioned over operational circuit 120 and is connected to body 100. Cover 130 is sufficiently translucent to permit sensor 60 to detect ambient light levels and UV light levels within the desired ranges. In certain embodiments, cover 130 is clear. In other embodiments, cover 130 is textured. Wires or leads 140 connect operational circuit 120 to power source PS and lamps L.

System 10 can be utilized to monitor light levels and turn one or more lamps L on and off at desired times. System 10 does this by detecting ambient light levels and UV light levels and turning output driver 50 on and off based on a comparison of the detected ambient light levels and UV light levels with preset threshold values. If system 10 determines that the level of sunlight is sufficiently low that illuminating lamps L is desirable, such as during dusk, dawn, storms, solar eclipses, or nighttime, the system operates to illuminate lamps L or to leave them illuminated if they are already on. If system 10 determines that the amount of sunlight is such that it is not desirable to illuminate lamps L, such as during daytime, the system operates to turn lamps L off or leave them off if they are not illuminated. Microcontroller 40 can be used to (a) set operational parameters, such as the detection channel (i.e., ambient light or UV light), threshold values of ambient light and UV light, gain, resolution, and/or reporting rate, (b) read the detected levels of ambient light, and/or UV light, and (c) compare the detected levels of ambient light and/or UV light with the threshold values. In certain embodiments, microcontroller 40 alternates reading the detected ambient light level and the detected UV light level at specified intervals. For example, microprocessor 40 can read data every 500 ms, thereby reading an ambient light/UV light data pair every second.

Figure 5:
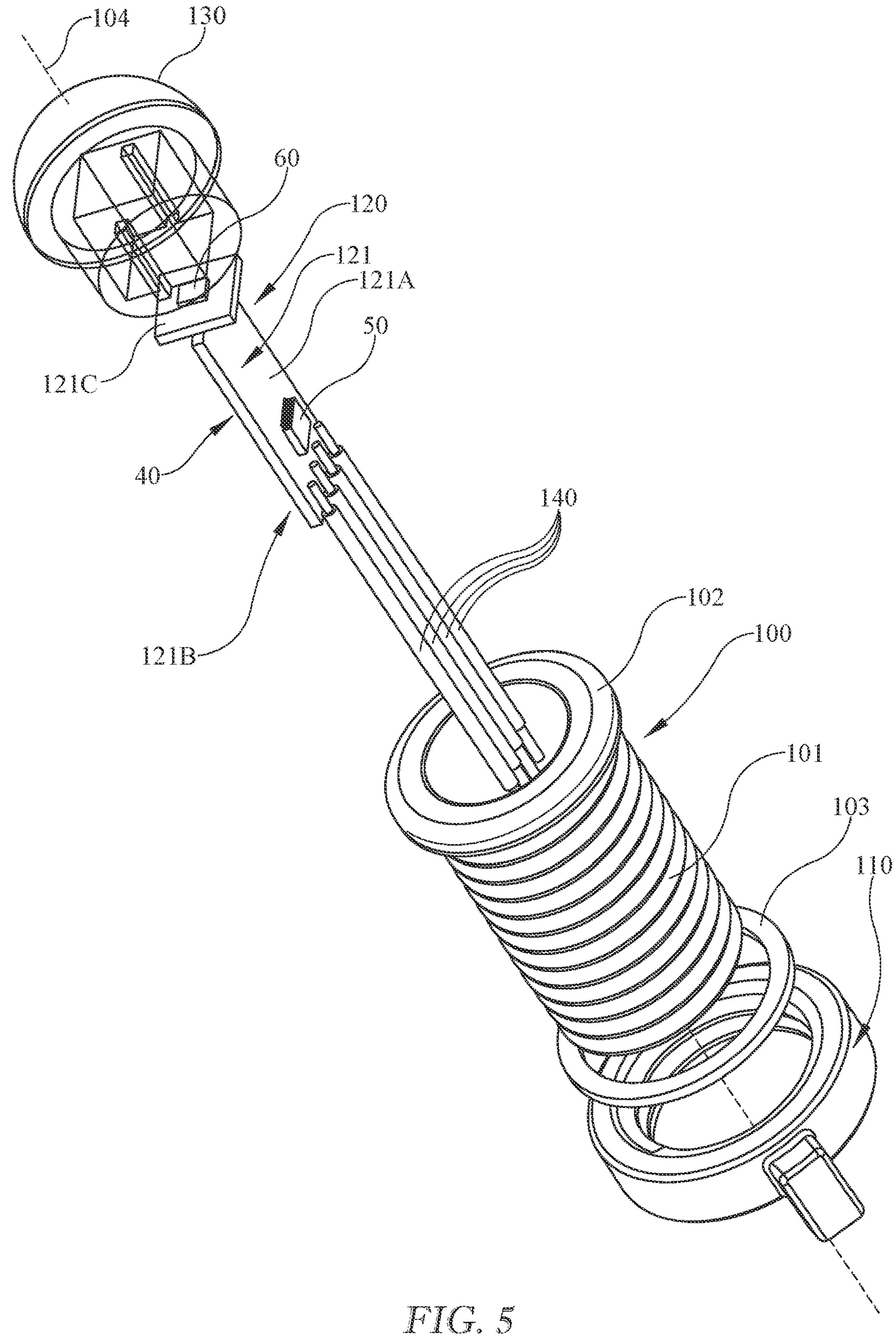
FIG. 5 is an exploded perspective view of an embodiment of a lighting control system according to one embodiment of the present invention.
Figure 6:
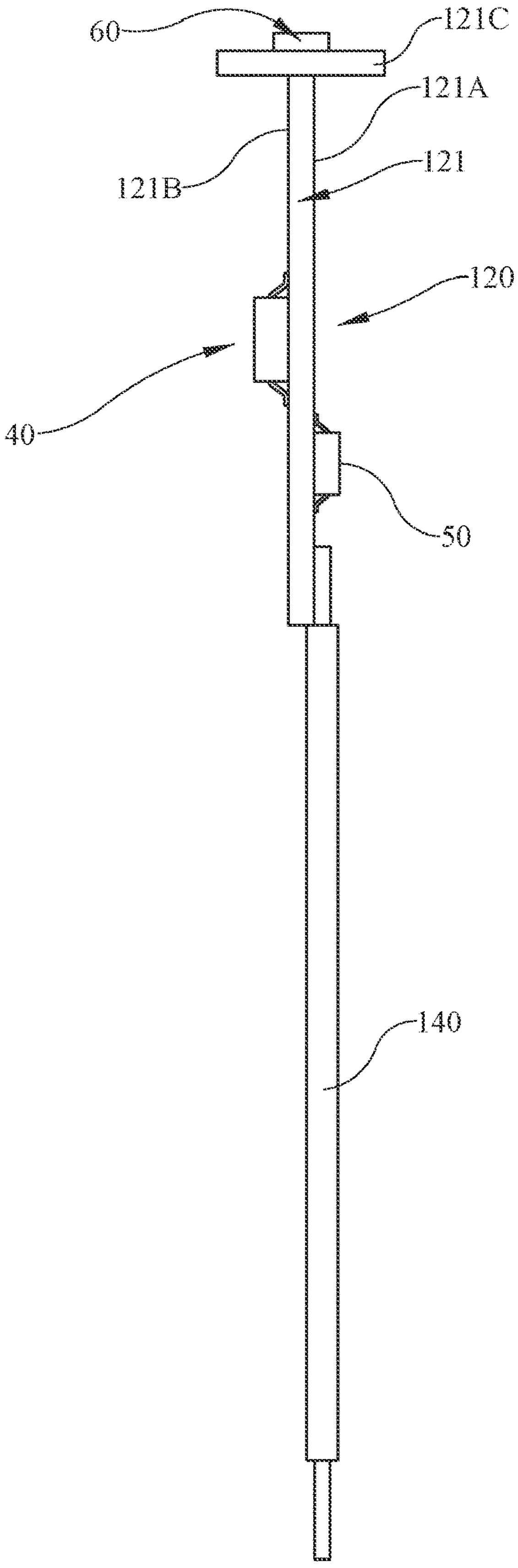
FIG. 6 is a side elevational view of an operational circuit and leads that are components of the lighting control system shown in FIG. 5.
Figure 7:
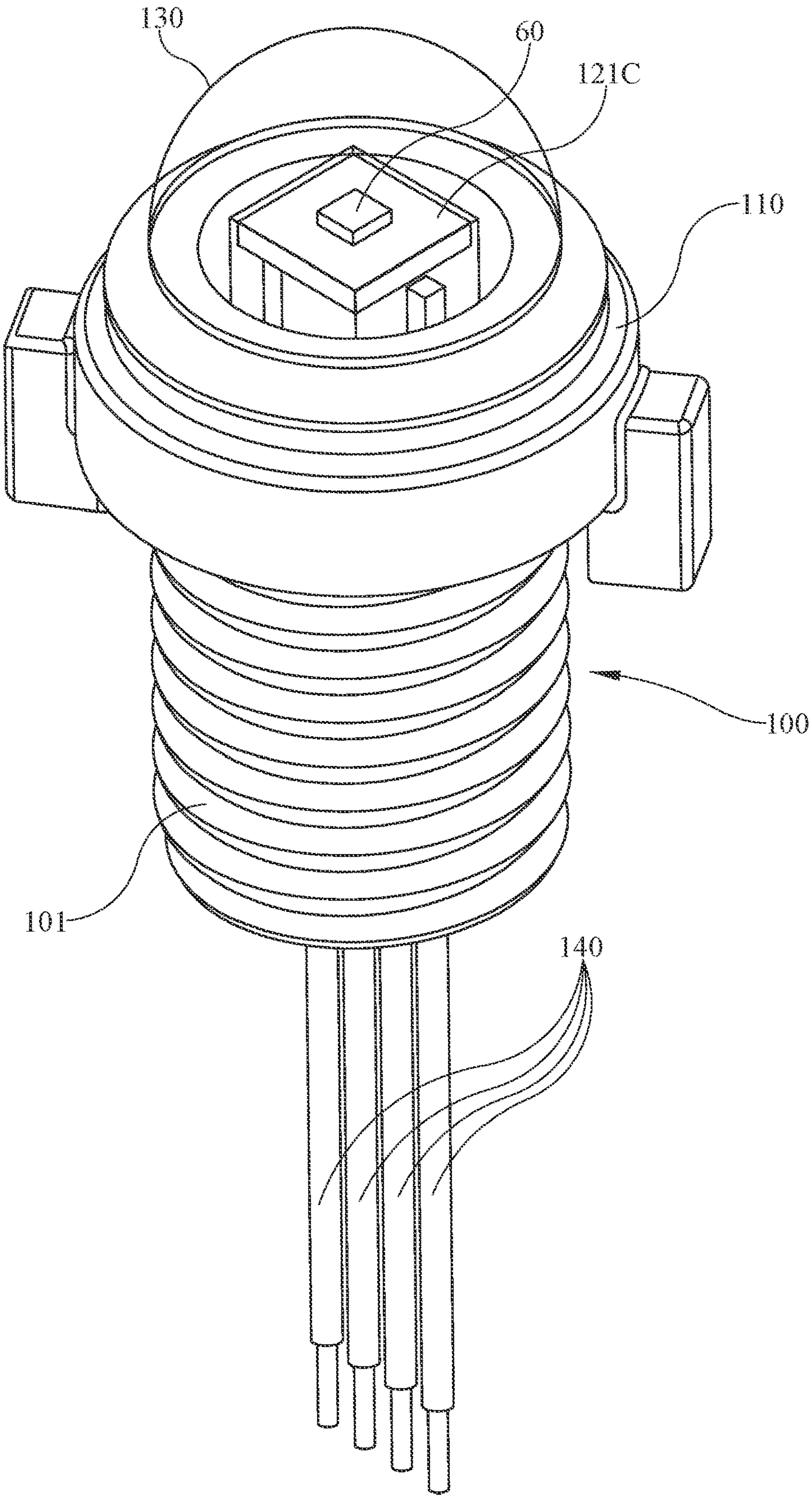
FIG. 7 is a perspective view of the lighting control system shown in FIG. 5.
Figure 8:
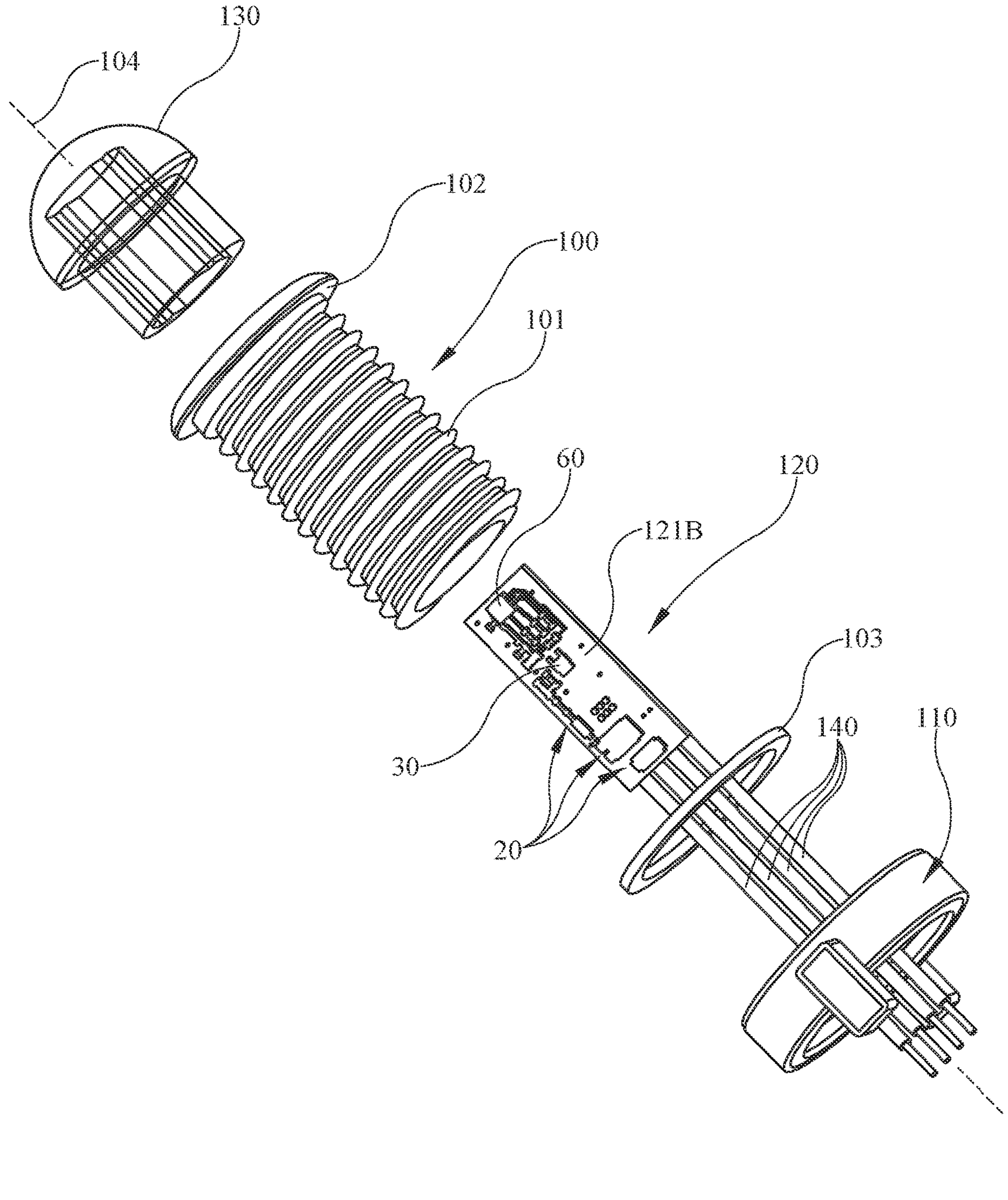
FIG. 8 is an exploded perspective view of an embodiment of a lighting control system according to one embodiment of the present invention.
Figure 9:
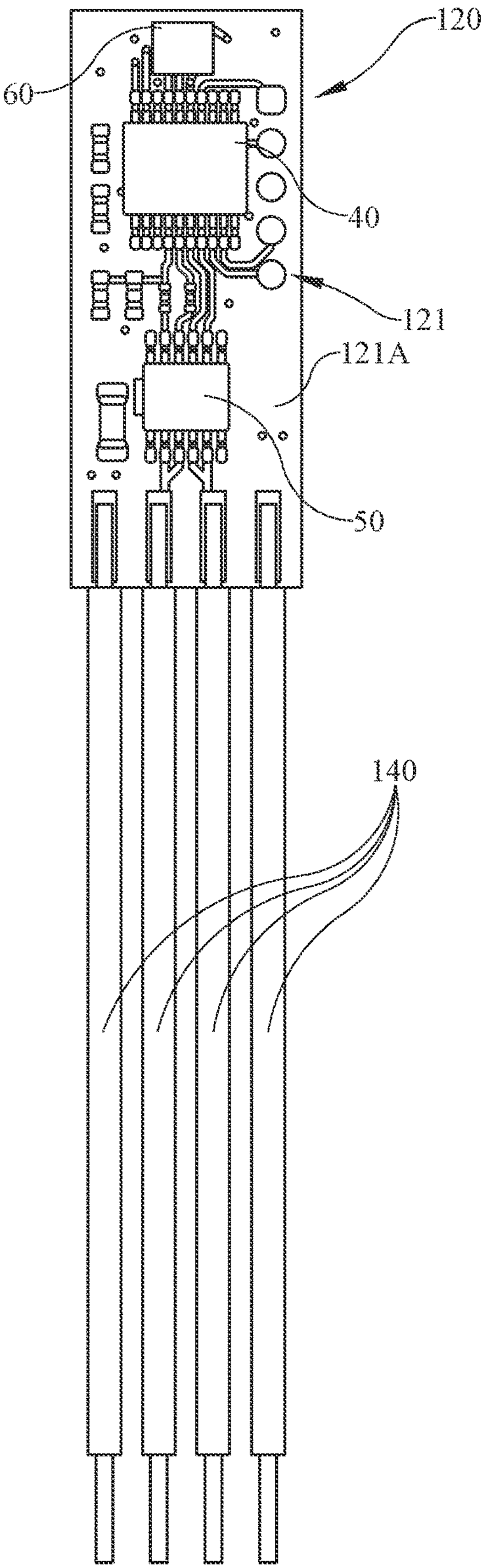
FIG. 9 is a side elevational view of an operational circuit and leads that are components of the lighting control system shown in FIG. 8.
Figure 10:
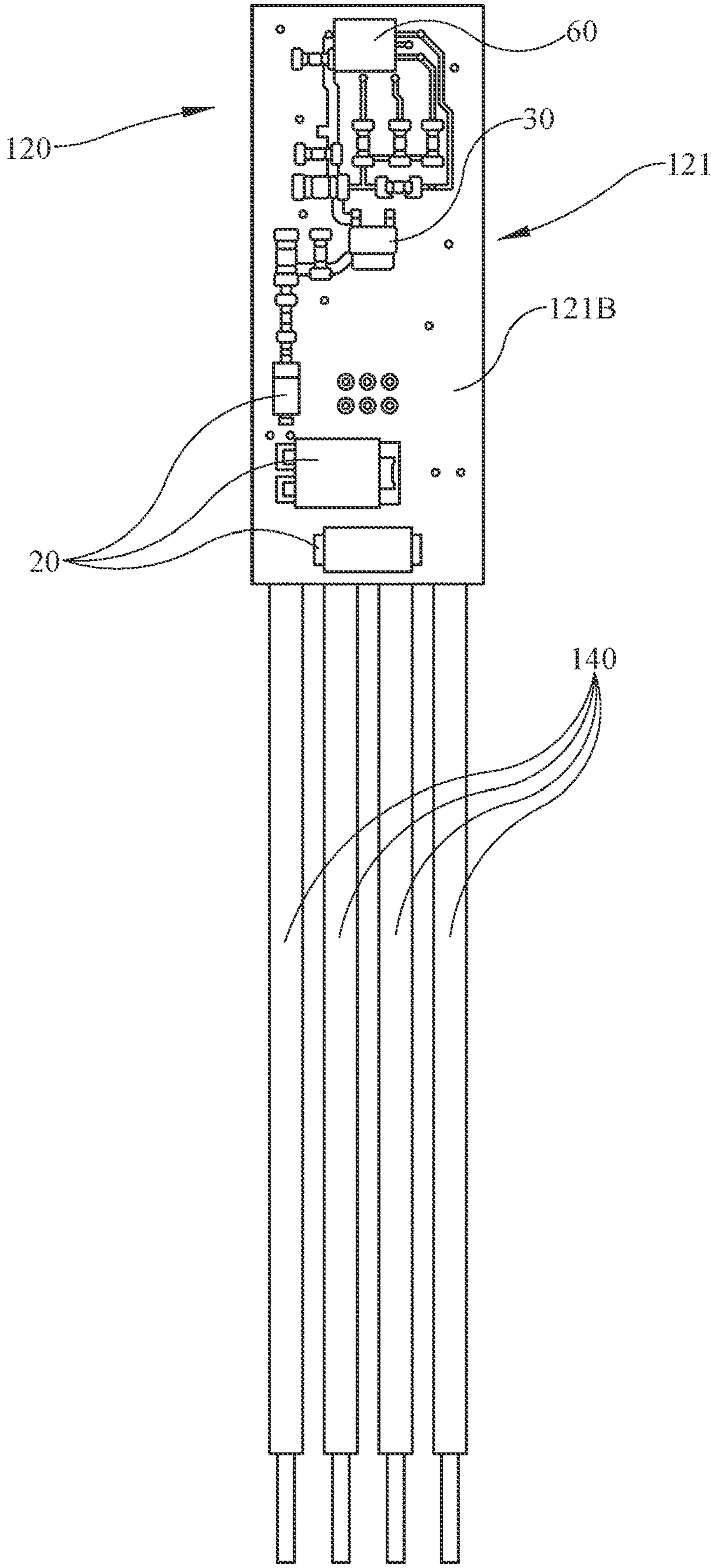
FIG. 10 is an opposite side elevational view of the operational circuit and leads shown in FIG. 9.
Figure 11:
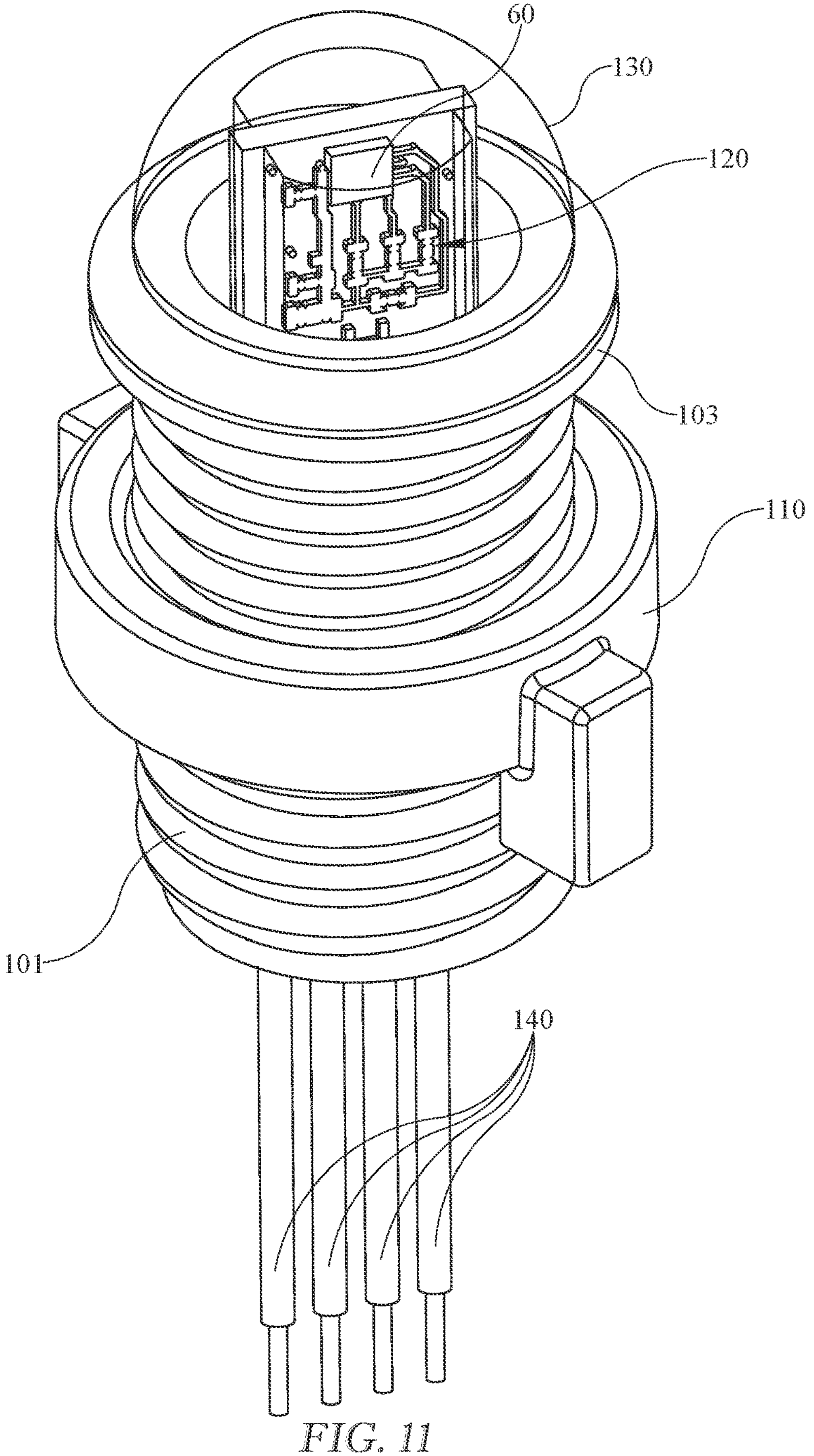
FIG. 11 is a perspective view of the lighting control system shown in FIG. 8.
Figure 12:
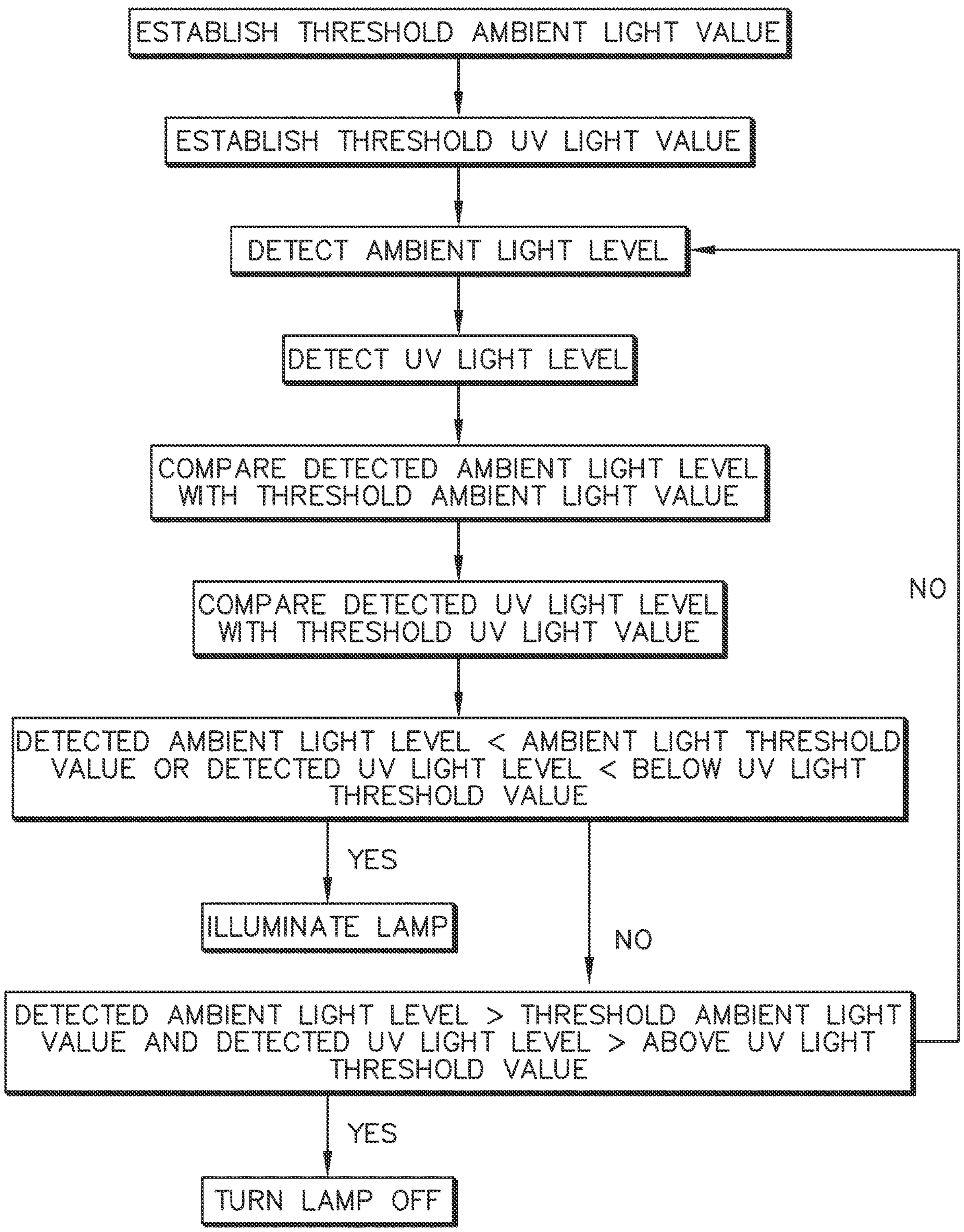
FIG. 12 is a flow chart illustrating a method of operating a lighting control system according to one embodiment of the present invention.

FIGS. 5-7 show a lighting control system according to another embodiment of the present invention. In this embodiment, printed circuit board 121 of operational circuit 120 is a single, planar member having opposing sides 121A and 121B. A support member 121C is connected to printed circuit board 121, and sensor 60 is mounted to support member 121C.

FIGS. 8-11 show a lighting control system according to another embodiment of the present invention. In this embodiment, two sensors 60 are mounted to printed circuit board 121. In the embodiment shown, one sensor 60 is mounted to side 121A of printed circuit board 121, and the other sensor 60 is mounted to side 121B of printed circuit board 121. Sensors 60 face perpendicular to longitudinal axis 104 of body 100.

In one method according to the present invention, microcontroller 40 is used to set a first threshold value for detected ambient light and a second threshold value for detected UV light. The ambient light threshold value is set such that a detected level below that value indicates a low level of sunlight or the absence of sunlight, such as during dusk, dawn, storms, solar eclipses, or nighttime. Microprocessor 40 reads the ambient light levels and UV light levels detected by sensor 60 and compares them to the threshold values. Because sunlight includes both ambient light and UV light, the ambient light and UV light thresholds are established to account for ambient light from both the sun and other sources, such as flashlights, yard lights, or other sources of artificial light. The UV light threshold value is set such that a detected level below that value indicates a low level of sunlight or the absence of sunlight, such as during dusk, dawn, storms, solar eclipses, or nighttime. If the detected level of ambient light is below the ambient light threshold value or the detected level of UV light is below the UV light threshold value, microcontroller 40 will turn output driver 50 on to illuminate lamps L if they are off. If the detected ambient light level is greater than the ambient light threshold value and the detected UV light level is greater than the UV light threshold, microcontroller 40 will turn output driver 50 off, thereby turning lamps L off if they are illuminated. Requiring both the detected ambient light level and the detected UV light level to be above the respective thresholds to turn lamps L off while requiring only one of the detected light levels to be below its threshold to illuminate lamps L biases the system in favor of turning lamps L on or leaving them on.

Requiring both the detected ambient light level and the detected UV light level to be above the respective thresholds to turn lamps L off also reduces the effects of transient high levels of ambient light. For example, if system 10 is utilized on a boat operating on a lake at night with lamps L illuminated and the boat sails past a well-lit dock, the detected level of ambient light as the boat passes the dock may be above the ambient light threshold value. However, the detected level of UV light will be below the UV light threshold value. Thus, lamps L will remain illuminated.

Other methods of the present invention incorporate a time delay feature to reduce the effects of transient ambient light. For example, microprocessor 40 can be programed to require multiple consecutive data pairs indicating that lamps L should be illuminated or turned off prior to operating output driver 50 to do so. In certain embodiments, microcontroller 40 can be programed to require a greater number of consecutive data pairs indicating that lamps L should be turned off than the number of consecutive data pairs required to illuminate lamps L. Doing so has the effect of favoring illuminating lamps L over turning lamps L off.

In other embodiments of the present invention, hysteresis is used in connection with the ambient light threshold value and the UV light threshold value to reduce the effects of transient ambient light and favor illuminating lamps L over turning lamps L off. For example, a hysteresis level of 10% would require microcontroller 40 to read a detected light level at least 10% below the applicable threshold to verify it as a below threshold level and 10% above the applicable threshold to verify it as an above threshold level. This feature also reduces the likelihood that system 10 will turn lamps L on and off when the detected levels are near the applicable thresholds.

In other embodiments of the invention, microcontroller 40 utilizes a running average of the detected light levels for comparison to the thresholds. Doing so further insulates operation of the system from the effects of transient light and/or detected light levels near the applicable thresholds. In still other embodiments, microcontroller 40 can be programmed to determine the rate of change of detected ambient light levels and detected UV light levels, thereby detecting sunset and sunrise. Microcontroller 40 can utilize these rates of change to slowly increase or decrease the brightness of lamps L, as opposed to turning lamps L on and off abruptly.

Although the present invention has been shown and described in detail, the same is by way of example only and is not a limitation on the present invention. For example, sensors 60 (as well as the other components of operational circuit 120) can be arranged on printed circuit board 121 in locations other than those illustrated. In other embodiments, more than one single output driver can be utilized instead of dual output driver 50. Various other modifications can be made to the systems and methods disclosed herein without out departing from the scope of the invention.

What is claimed is:

1. A lighting control system, including:

a driver for selectively illuminating one or more lamps and turning off one or more lamps under specified conditions;

a sensor for detecting light levels, the sensor including a first photodiode for detecting ambient light levels and a second photodiode for detecting UV light levels;

a microcontroller connected to the driver and the sensor, the microcontroller programmable to read the light levels detected by the sensor, determine if one or more of the specified conditions are satisfied, and operate the driver to selectively illuminate one or more of the lamps and/or turn one or more of the lamps off if one or more of the specified conditions is present; and wherein the microcontroller is programmable with an ambient light threshold value and a UV light threshold value and the microcontroller compares the detected ambient light levels with the ambient light threshold value and the detected UV light levels with the UV light threshold value to determine if one or more of the specified conditions is present.

2. A method of operating a lighting control system, the system including a driver for selectively illuminating a lamp and turning the lamp off, a sensor for detecting light levels, and a microcontroller, the method including:

establishing a threshold ambient light value;

establishing a threshold UV light value;

utilizing the sensor to detect an ambient light level;

utilizing the sensor to detect a UV light level;

utilizing the microprocessor to compare the detected ambient light level with the threshold ambient light value;

utilizing the microprocessor to compare the detected UV light level with the threshold UV light value; and utilizing the microprocessor to operate the driver to illuminate the lamp if the detected ambient light level is below the ambient light threshold value or the detected UV light level is below the UV light threshold value, and utilizing the microprocessor to operate the driver to turn the lamp off if the detected ambient light level is above the threshold ambient light value and the detected UV light level is above the UV light threshold value.

3. The method according to claim 2, further including the steps of:

utilizing the sensor to detect multiple ambient light levels;

utilizing the sensor to detect multiple UV light levels;

utilizing the microprocessor to compare the multiple detected ambient light levels with the ambient light threshold value;

utilizing the microprocessor to compare the multiple detected UV light levels with the UV light threshold value; and utilizing the microprocessor to operate the driver to illuminate the lamp if the multiple detected ambient light levels are below the ambient light threshold value or the multiple detected UV light levels are below the UV light threshold value, and utilizing the microprocessor to operate the driver to turn the lamp off if the multiple detected ambient light levels are above the threshold ambient light value and the multiple detected UV light levels are above the UV light threshold value.

4. The method according to claim 3, further including the steps of:

specifying a number of consecutive detected ambient light levels below the ambient light threshold value required to cause the microprocessor to operate the driver to illuminate the lamp;

specifying a number of consecutive detected UV light levels below the UV light threshold value required to cause the microprocessor to operate the driver to illuminate the lamp;

specifying a number of consecutive detected ambient light levels above the ambient light threshold value required to cause the microprocessor to operate the driver to turn the lamp off;

specifying a number of consecutive detected UV light levels above the UV light threshold value required to cause the microprocessor to operate the driver to turn the lamp off; and wherein the number of consecutive detected ambient light levels above the ambient light threshold value and the number of consecutive detected UV light levels above the UV light threshold value required to cause the microprocessor to operate the driver to turn the lamp off are greater than the number of consecutive detected ambient light levels below the ambient light threshold value and the number of consecutive detected UV light levels below the UV light threshold value required to cause the microprocessor to operate the driver to illuminate the lamp.

5. The method according to claim 3, wherein the microcontroller compares an average of the multiple detected ambient light levels with the ambient light threshold value and an average of the multiple detected UV light levels with the UV light threshold value.

6. The method according to claim 3, further including the step of utilizing the microprocessor to determine the rate of change of the detected ambient light levels and the rate of change of the detected UV light levels, and utilizing the microprocessor to operate the driver to increase and decrease the illumination intensity of the lamp based on at least one of the rates of change.

7. The method according to claim 2, further including the step of establishing a hysteresis level associated with the ambient light threshold value and the UV light threshold value, and wherein the microprocessor excludes detected ambient light levels and detected UV light levels within the hysteresis level from the comparisons utilized by the microprocessor to operate the driver.

8. A method of operating a lighting control system, the system including a driver for selectively illuminating a lamp and turning off the lamp, a sensor for detecting light levels, and a microcontroller, the method including:

establishing a threshold ambient light value;

establishing a threshold UV light value;

utilizing the sensor to detect an ambient light level;

utilizing the sensor to detect a UV light level;

utilizing the microprocessor to compare the detected ambient light level with the threshold ambient light value;

utilizing the microprocessor to compare the detected UV light level with the threshold UV light value; and utilizing the microprocessor to operate the driver to illuminate and/or turn off the lamp based on the comparison of the detected ambient light level with the threshold ambient light value and/or the comparison of the detected UV light level with the UV light threshold value.

9. The method of claim 8, wherein the microprocessor operates the driver to illuminate the lamp if the detected ambient light level is below the ambient light threshold value.

10. The method according to claim 8, wherein the microprocessor operates the driver to illuminate the lamp if the detected UV light level is below the UV light threshold value.

11. The method according to claim 8, wherein the microprocessor operates the driver to turn the lamp off if the detected ambient light level is above the threshold ambient light value and the detected UV light level is above the UV light threshold value.

12. The method according to claim 8, further including the steps of:

utilizing the sensor to detect multiple ambient light levels;

utilizing the sensor to detect multiple UV light levels;

utilizing the microprocessor to compare the multiple detected ambient light levels with the ambient light threshold value;

utilizing the microprocessor to compare the multiple detected UV light levels with the UV light threshold value; and utilizing the microprocessor to operate the driver to illuminate and/or turn off the lamp based on the comparison of the multiple detected ambient light levels with the threshold ambient light value and/or the comparison of the multiple detected UV light levels with the UV light threshold value.

13. The method according to claim 8, further including the steps of:

specifying a number of consecutive detected ambient light levels required to cause the microprocessor to operate the driver to illuminate the lamp;

specifying a number of consecutive detected UV light levels required to cause the microprocessor to operate the driver to illuminate the lamp;

specifying a number of consecutive detected ambient light levels required to cause the microprocessor to operate the driver to turn the lamp off;

specifying a number of consecutive detected UV light levels required to cause the microprocessor to operate the driver to turn the lamp off; and wherein the number of consecutive detected ambient light levels and consecutive detected UV light levels required to cause the microprocessor to operate the driver to turn the lamp off are greater than the number of consecutive detected ambient light levels and consecutive detected UV light levels required to cause the microprocessor to operate the driver to illuminate the lamp.

14. The method according to claim 12, wherein the microcontroller compares an average of the multiple detected ambient light levels with the ambient light threshold value and an average of the multiple detected UV light levels with the UV light threshold level.

15. The method according to claim 12, further including the step of utilizing the microprocessor to determine the rate of change of the detected ambient light levels and the rate of change of the detected UV light levels and utilizing the microprocessor to operate the driver to increase and decrease the illumination intensity of the lamp based on at least one of the rates of change.

16. The method according to claim 8, further including the step of establishing a hysteresis level associated with the ambient light threshold value and the UV light threshold value, and wherein the microprocessor excludes detected ambient light levels and detected UV light levels within the hysteresis level from the comparisons utilized by the microprocessor to operate the driver.

17. A method of operating a lighting control system, the system including a driver for selectively illuminating a lamp and turning off the lamp, a sensor for detecting light levels, and a microcontroller, the method including:

establishing a threshold value for a first type of light;

establishing a threshold value for a second type of light;

utilizing the sensor to detect a level of the first type of light;

utilizing the sensor to detect a level of the second type of light;

utilizing the microprocessor to compare the detected level of the first type of light with the threshold value of the first type of light;

utilizing the microprocessor to compare the detected level of the second type of light with the threshold value for the second type of light; and utilizing the microprocessor to operate the driver to illuminate and/or turn off the lamp based on the comparison of the detected level of the first type of light with the threshold value for the first type of light and the comparison of the detected level of the second type of light with the threshold value for the second type of light.

* * * * *